United States Patent [19]

Custro et al.

[11] Patent Number: 5,290,872
[45] Date of Patent: Mar. 1, 1994

[54] BRANCHED AND HYDROGENATED BLOCK COPOLYMER, PROCEDURES FOR ITS PREPARATION AND USE

[75] Inventors: Sergio Custro; Gian T. Viola, both of Ravenna, Italy

[73] Assignee: Enichem Elastomeri s.r.l., Milan, Italy

[21] Appl. No.: 734,774

[22] Filed: Jul. 23, 1991

[30] Foreign Application Priority Data

Jul. 25, 1990 [IT] Italy .................. 21042 A/90

[51] Int. Cl.$^5$ ............................ C08F 297/04
[52] U.S. Cl. ........................................... 525/314
[58] Field of Search ........................................... 525/314

[56] References Cited

U.S. PATENT DOCUMENTS

| | | | |
|---|---|---|---|
| 3,078,254 | 2/1963 | Zelinski et al. | 525/98 |
| 3,244,644 | 2/1962 | Stiles | 502/332 |
| 3,265,765 | 8/1966 | Holden et al. | 525/314 |
| 3,280,084 | 10/1966 | Zelinski et al. | 525/271 |
| 3,594,452 | 7/1971 | De La Mare et al. | 525/314 |
| 3,644,588 | 2/1972 | Hassell | 525/314 |
| 3,670,054 | 6/1972 | DeLaMare et al. | 525/314 |
| 3,766,301 | 10/1973 | De La Mare et al. | 525/314 |
| 3,937,760 | 2/1976 | Cole et al. | 525/314 |
| 4,153,647 | 5/1979 | Glukhovskoi et al. | 525/314 |
| 4,291,139 | 9/1981 | Halasa et al. | 525/314 |
| 4,874,821 | 10/1989 | Agostinis et al. | 525/314 |

FOREIGN PATENT DOCUMENTS

| | | |
|---|---|---|
| 2061961 | 5/1981 | United Kingdom . |
| 2225330 | 5/1990 | United Kingdom . |

OTHER PUBLICATIONS

WPIL, 87-139969 & JP-A-62-079211, Apr. 11, 1987.

*Primary Examiner*—James J. Seidleck
*Assistant Examiner*—M. L. Warzel
*Attorney, Agent, or Firm*—Oblon, Spivak, McClelland, Maier & Neustadt

[57] ABSTRACT

A branched and hydrogenated block copolymer can be defined by the formula $[(EB)_1-HT-A-(EB)_2]_n X$, where $(EB)_1$ and $(EB)_2$ are hydrogenated polydiene blocks, A is a polyvinylaromatic block, HT is a random copolymer segment made up of hydrogenated dienic monomeric and vinylaromatic units, X is a coupling radical having a valence equal to n, and n is a whole number ranging from 3 to 20.

This kind of block copolymer shows excellent mechanical characteristics and resistance to atmospheric agents, even when used in combination with other resins.

12 Claims, No Drawings

BRANCHED AND HYDROGENATED BLOCK COPOLYMER, PROCEDURES FOR ITS PREPARATION AND USE

The present invention concerns a branched and hydrogenated block copolymer, and the procedure for its preparation.

The anionic polymerization of dienic and vinylaromatic monomers in the presence of metal alkyl or metal aryl catalysts, obtaining so-called "living polymers", is a well-known technique and is described by M. Schwarc in "Carbanions, Living Polymers and El. Transfer Processes", Interscience Publisher, J. Wiley and Sons, New York, 1956.

With this living polymer technique, in particular, it is possible to prepare both linear and branched block copolymers, especially block copolymers of polybutadiene and polystyrene, as, for example, those mentioned in the U.S. Pat. Nos. 3,078,254, 3,244,644, 3,265,765, 3,280,084, 3,594,452, 3,766,301 and 3,937,760.

These block copolymers are widely used, for example, in the field of adhesive, in mixtures with bitumen, in compositions with various plastic materials, in the shoe industry, etc.

One serious problem with these block copolymers consists in the difficulty of providing a good balance between the rheological characteristics, the mechanical resistance and thermo-oxidation. For example, the well-known three-block copolymers A-B-A (polystyrene-polybutadiene-polystyrene) normally show high mechanical characteristics but poor thermo-oxidation resistance. In addition, their rather high viscosity, both in their molten state and in solution, creates problems in the processing and transformation. On the other hand, the four-block $(AB)_2$ linear copolymers, known in the art, containing all similar polybutadiene blocks, have generally good rheological but poor mechanical properties. Similar considerations go for multiblock $(AB)_n$ linear copolymers, where n is a whole number higher than 2 and can reach a value of about 10.

U.S. Pat. No. 4,874,821 describes a linear copolymer with four alternating blocks $B_1—A_1—B_2—A_2$, having definite proportions among the blocks, and also containing, between blocks $B_1$ and $A_1$ a copolymeric sequence formed by dienic and vinylaromatic monomeric units linked at random to each other. This kind of block copolymer is particularly suitable for use in adhesive formulations having good cohesion characteristics and thermo-oxidation stability.

The applicant described, in a pending patent application Ser. No. 07/734,773, filed Jul. 23, 1991, a block copolymer which can be defined with the formula $(B_1—T—A—B_2)_nX$ where $B_1$ and $B_2$ are polydienic blocks; A is a polyvinylaromatic block; T is a random copolymeric segment formed by dienic and vinylaromatic monomeric units; X is a coupling radical of valence n, and n is a whole number between 3 and 20. This kind of block copolymer can have many applications and is used in accordance with its composition. In particular copolymers with a high content of vinylaromatic monomer have high transparency to light as well as a high shock-resistance, therefore these copolymers can either be used on their own or in mixtures with thermoplastic polymers, for example polystyrene, to produce manufactures which are used in the food packaging industry. Moreover, copolymers having a low content of vinylaromatic monomer and a weight ratio between blocks $B_2$ and $B_1$ close to one, can be combined with oils and asphaltic resins to give adhesive formulations with good adhesion and cohesion characteristics.

Furthermore, copolymers having an A block content of approx. 30-40% by weight, and a weight ratio between block $B_2$ and block $B_1$ of approx. 10/1, mixed with bitumen, produce manufactures with good resistance to high and low temperatures.

It was found that, by hydrogenating the diene units of the above mentioned copolymer $(B_1—T—A—B_2)_nX$, it is possible to obtain a further and unexpected improvement of some characteristics, particularly the mechanical properties and the resistance to thermo-oxidation and to atmospheric agents.

In accordance with the above, the present invention concerns a branched and hydrogenated block copolymer which can be defined with the formula:

$$[(EB)_1—HT—A—(EB)_2]_nX \qquad [I]$$

where:

$(EB)_1$ and $(EB)_2$ are hydrogenated polydiene blocks,

A is a polyvinylaromatic block,

HT is a random copolymer segment made up of hydrogenated dienic monomeric and vinylaromatic units, X is a coupling radical having a valence equal to n, and n is a whole number ranging from 3 to 20.

the above copolymer having a weight average molecular weight of between 60,000 and 500,000; an A block content from 20 to 80% by weight; a $(EB)_1+(EB)_2$ block content from 20 to 80% by weight; a weight ratio between blocks $(EB)_1$ and $(EB)_2$ from 0.1 to 1.0; and a HT segment content from 0 to 40% by weight.

In the present invention, branched and hydrogenated block copolymer means that the amount of hydrogenation of the diene units in the copolymer is at least equal to 80%, preferably ranges between 95 and 100%.

In the present invention, the preferable weight ratio in the branched and hydrogenated block copolymer, between blocks $(EB)_1$ and $(EB)_2$ varies from 0.2 to 0.5, the copolymeric segment HT varies from 5 to 40% by weight of the block copolymer and n is a whole number from 3 to 10.

It is most preferable in the branched and hydrogenated block copolymer for block A to be a polystyrene block, blocks $(EB)_1$ and $(EB)_2$ to be polybutadiene blocks, segment HT a random copolymer of hydrogenated butadiene units and styrene units in quantities from 10 to 30% by weight in relation to the copolymer, n is the whole number 3 or 4 and X is chosen from between $=Si=$ and $CH_3Si\equiv$.

The branched and hydrogenated block copolymer of the present invention is used particularly in those application fields where the maximum level of mechanical characteristics are required, such as shock resistance, stability to thermooxidation and resistance to atmospheric agents. In particular, said copolymer can be usefully used combined with bitumen for special applications, for adhesive formulations for manufactures which have to satisfy aesthetical requirements and in compositions with polyolefins for applications in the car industry.

The present invention also includes procedures for the preparation of the branched and hydrogenated block copolymer (I).

More specifically, when the copolymeric sequence HT is present in the block copolymer (I), the procedure for its preparation includes the following steps carried out in succession:

(a) Polymerization, using the living polymer technique, of specific quantities of diolefin and vinylaromatic monomer mixed together until the complete, or almost complete, conversion of the monomers is reached. The formation of a living copolymer of the $B_1$—T—A type is thus obtained.

(b) Addition of a specific amount of diene monomer to the copolymer obtained in step (a) and polymerization until complete, or almost complete, conversion of the added diene monomer. The formation of a living copolymer of the $B_1$—T—A—$B_2$ type is thus obtained.

(c) Coupling of the living polymeric chains obtained in step (b) using a polyfunctional coupling agent. The formation of the branched block copolymer $(B_1$—T—A—$B_2)_n$X is thus obtained.

(d) Hydrogenation of the diene units of the copolymer obtained in step (c) by means of catalytic hydrogenation. The branched and hydrogenated block copolymer (I) having the copolymeric segment HT,[(EB)$_1$—HT—A—(EB)$_2]_n$X, is thus obtained.

(e) Recovery of the branched and hydrogenated block copolymer from the hydrogenation product of step (d).

Using the procedure described above, it is possible to vary the composition and length of the copolymeric segment HT by adding polar products, such as ethers and amines, to the reaction system.

When the copolymeric sequence HT is not present in the block copolymer (I), the procedure for its preparation includes the following steps in succession:

(a) Polymerization, using the living polymer technique, of a measured quantity of diolefin until the complete, or almost complete, conversion of the fed polyolefin. The formation of living block B, is thus obtained.

(b) Addition of a measured amount of vinylaromatic monomer to the polymer obtained in step (a) and polymerization until the complete, or almost complete, conversion of the fed vinylaromatic monomer. The formation of a living copolymer of $B_1$—A type is thus obtained.

(c) Addition of a measured quantity of diolefin to the copolymer obtained in step (b) and polymerization until the complete, or almost complete, conversion of the fed diolefin. The formation of a living copolymer of the $B_1$—A—$B_2$ type is thus obtained.

(d) Coupling of the living polymeric chains obtained in step (c) using a polyfunctional coupling agent. The formation of the branched block copolymer $(B_1$—A—$B_2)_n$X, without the copolymeric T segment in its chain, is thus obtained.

(e) Hydrogenation of the diene units of copolymer obtained in step (d) by means of catalytic hydrogenation. The branched and hydrogenated block copolymer (I) without the copolymeric segment HT,[(EB)$_1$—A—(EB)$_2]_n$X, is thus obtained.

(f) Recovery of the branched and hydrogenated block copolymer from the hydrogenation product of step (e).

In particular, the polymerization steps are carried out in an aliphatic or cycloaliphatic organic solvent, at temperatures ranging from 30° to 150° C., at a pressure equal to, or higher than the atmospheric value, in the presence of metal alkyl or metal aryl catalysts. Preferably the solvent should be n-hexane or cyclohexane, the reaction temperature should range from 50° to 100° C. and the catalyst should be alkyllithium whose alkyl group contains from 3 to 7 carbon atoms, and said catalyst should be used in amounts from 0.025 to 0.20 parts by weight every 100 parts of the total monomers. In the polymerization mixture, polar compounds such as ethers and amines can be present at a maximum concentration of approx. 0.1% by weight with respect to the solvent.

In the coupling phase, it is preferable to work at a temperature ranging from 110° to 125° C. in the presence of a coupling agent chosen among the esters of aliphatic and aromatic bicarboxylic acids, chlorine derivatives of aliphatic or aromatic hydrocarbons, the halogen derivatives of aliphatic or aromatic silanes, arenes containing unsaturated hydrocarbon radicals and the tri or tetra-chlorine derivatives of silicon, tin or germanium.

For the practical use it is preferable for the coupling agent to be either silicon tetrachloride or $CH_3SiCl_3$. It is also preferable for the diolefin to be butadiene and the vinylaromatic monomer to be styrene.

In the hydrogenation phase it is preferable to operate in the presence of a hydrogenation catalyst, with a hydrogen pressure of from 20 to 1,000 psi and at a temperature from 30° to 200° C. The best conditions are: hydrogen pressure from 150 to 600 psi and temperature from 40° to 130° C. The suitable catalysts are those which are well known in the art, preferably those obtained by contact of an aluminum alkyl with a nickel or cobalt compound.

At the end of the hydrogenation reaction, the branched and hydrogenated block copolymer can be recovered from the reaction mixture, after having separated the catalytic residues, by means of the usual techniques, such as by coagulation obtained by treating the polymeric solution with alcohols and/or an excess of water, containing suitable reagents for the elimination of the catalytic residues.

The experimental examples which follow are intended to give a more detailed illustration of the present invention.

EXAMPLE 1

1,200 g of anhydrous cyclohexane containing 2.0 g of tetrahydrofurane and 30 g of butadiene are charged into a 2 liter reactor under stirring. The temperature of the mixture is brought to 55° C. and 0.220 g of sec-butyllithium in a n-hexane solution are then added. After 15 minutes of reaction the mass temperature reaches 70° C. and the conversion of butadiene is almost complete. 150 g of styrene are then added and after 15 minutes of reaction the temperature of the mixture reaches 80° C. and the conversion of styrene is almost complete. 20 g of butadiene are added. After 10 minutes of reaction the temperature of the mixture reaches 87° C. and the conversion of butadiene is almost complete. 0.160 g of silicon tetrachloride, in a solution of cyclohexane, are finally added and after 5 minutes the coupling reaction of the living chains is practically complete (97% yield).

A block copolymer of the $(B_1$—A—$B_2)_n$X type is thus obtained, where $B_1$ and $B_2$ are butadiene blocks, A is the styrene block, X=Si and n=4, with the following characteristics:

| | |
|---|---|
| $Mw \cdot 10^{-3}$ (weight average molecular weight obtained by GPC analysis) | 250 |
| Total styrene % | 75 |

-continued

| | |
|---|---|
| (by weight on the total styrene calculated by IR analysis) | |
| Styrene % in the blocks (styrene % by weight in the blocks calculated by demolition by means of OsO4) | 75 |

The solution of the block copolymer is transferred into a stirred 2 liter reactor, in a hydrogen atmosphere. The mass is heated to 60° C. and the mixture of a catalyst, prepared by stirring 0.109 g of nickel acetylacetonate and 0.19 g of aluminum triethyl in 20 ml of cyclohexane, is then added. The hydrogenation reaction is carried out at 500 psi of hydrogen over a period of 3.5 hours. After this time, the hydrogenation of butadiene units, determined by means of iodine titration, is equal to 98.8%.

The catalytic residues are separated by extraction with diluted water solution of hydrochloric acid, followed by washing with water. Once the washing was completed, 0.2 g of 2,6-di-tert-butyl-4-methylphenol were added to the hydrogenated copolymer in cyclohexane solution. The hydrogenated copolymer is recovered by means of coagulation with a mixture of methyl alcohol and ethanol, and is then dried in a vacuum oven at 60° C. over a period of 18 hours.

EXAMPLE 2

1,200 g of anhydrous cyclohexane containing 16 g of butadiene and 92 g of styrene are charged into a 2 liter reactor under stirring. The temperature of the mixture is brought to 50° C. and 0.3 g of sec-butyllithium in a n-hexane solution ate then added. After 30 minutes of reaction the mass temperature reaches 58° C. and the conversion of the monomers is almost complete. 92 g of butadiene are then added and after 10 minutes of reaction the temperature of the mixture reaches 82° C. and the conversion of butadiene is almost complete. 0.15 g of $CH_3SiCl_3$ in a solution of cyclohexane, are finally added and after 5 minutes the coupling reaction of the living chains is practically complete (97.5% yield).

A block copolymer of the $(B_1—A—B_2)_nX$ type is thus obtained, where $B_1$ and $B_2$ are butadiene blocks, A is the styrene block, $X=CH_3Si$ and $n=3$, with the following characteristics:

| | |
|---|---|
| Mw.$10^{-3}$ | 98 |
| Total styrene % | 46 |
| Styrene % in the blocks | 40 |

The solution of the block copolymer is transferred into a stirred 2 liter reactor, in a hydrogen atmosphere. The mass is heated to 60° C. and the mixture of a catalyst, prepared by stirring 0.2 g of nickel 2-ethylhexanoate and 0.25 g of aluminum triisobutyl in 20 ml of cyclohexane, is then added. The hydrogenation reaction is carried out at 600 psi of hydrogen over a period of 4.0 hours. After this period means of iodine titration, is equal to 98.5%.

The catalytic residues are separated by extraction with diluted water solution of sulphuric acid. followed by washing with water. Once the washing was completed, 0.2 g of 2,6-di-tert-butyl/-4-methylphenol were added to the hydrogenated copolymer in cyclohexane solution. The hydrogenated copolymer is recovered by means of coagulation with a mixture of methanol and ethanol, and is then dried in a vacuum oven at 60° C. over a period of 18 hours.

We claim:

1. Branched and hydrogenated block copolymer of the formula:

$$[(EB)_1—HT—A—(EB)_2]_nX$$

where:
(EB)$_1$ and (EB)$_2$ are hydrogenated polydiene blocks,
A is a polyvinylaromatic block,
HT is a random copolymer segment made up of hydrogenated dienic monomeric and vinylaromatic units,
X is a coupling radical having a valence equal to n, and n is a whole number ranging from 3 to 20,
the above copolymer having a weight average molecular weight of between 60,000 and 500,000; an A block content from 20 to 80% by weight; a (EB)$_1$+(EB)$_2$ block content from 20 to 80% by weight; a weight ratio between blocks (EB)$_1$ and (EB)$_2$ from 0.1 to 1.0; and a HT segment content from 5 to 40% by weight.

2. Branched and hydrogenated block copolymer according to claim 1, wherein the amount of hydrogenation of the diene units is not less than 80%.

3. Branched and hydrogenated block copolymer according to claim 1, wherein the weight ratio between block (EB)$_1$ and block (EB)$_2$ ranges from 0.2 to 0.5; and n is a whole number from 3 to 10.

4. Block copolymer according to claim 3, wherein the copolymeric block HT content varies from 10 to 30% by weight of the block copolymer and n is the whole number 3 or 4.

5. Branched and hydrogenated block copolymer according to claim 1, wherein block A is a polystyrene block, blocks (EB)$_1$ and (EB)$_2$ are hydrogenated polymerization blocks, segment HT is a random copolymer of hydrogenated butadiene units and styrene units and X is $=Si=$ or $CH_3Si\equiv$.

6. Process for the preparation of a branched and hydrogenated block copolymer of the formula:

$$[(EB)_1—HT—A—(EB)_2]_nX$$

where:
(EB)$_1$ and (EB)$_2$ are hydrogenated polydiene blocks,
A is a polyvinylaromatic block,
HT is a random copolymer segment made up of hydrogenated dienic monomeric and vinylaromatic units,
X is a coupling radical having a valence equal to n, and
n is a whole number ranging from 3 to 20,
the above copolymer having a weight average molecular weight of between 60,000 and 500,000; an A block content from 20 to 80% by weight; a (EB)$_1$+(EB)$_2$ block content from 20 to 80% by weight; a weight ratio between blocks (EB)$_1$ and (EB)$_2$ from 0.1 to 1.0; and a HT segment content from 5 to 40% by weight, comprising the steps of:
(a) polymerizing a mixture of diolefin and vinyl aromatic monomers until complete, or almost complete, conversion of the monomers to obtain a living copolymer of the formula $B_1—T—A$, where T is a random copolymer segment of dienic and vinylaromatic units, $B_1$ is a polydiene block and A is as above defined, (b) adding a diene monomer to the copolymer obtained in step (a) and polymerizing the added diene monomer until complete, or almost complete conversion of said added diene monomer to obtain a living copolymer of the formula $B_1$—T—A—$B_2$, where $B_1$, T and A are as above defined and $B_2$ is a polydiene block, (c) coupling the living polymeric chains obtained in step (b) with polyfunctional coupling agent to obtain a branched block copolymer of the formula $(B_1$—T—A—$B_2)_n$X, where $B_1$, T, A, $B_2$, X and n are as above defined, and (d) hydrogenating the diene units of the copolymer obtained in step (c) by catalytic hydrogenation and (e) recovering said branched and hydrogenated block copolymer of the formula $[(EB)_1$—HT—A—$(EB)_2]_n$X from the hydrogenation product of step (d), wherein $EB_1$, HT, A, $EB_2$, X and n are as above defined.

7. Process according to claim 6, wherein the polymerization steps are carried out using an aliphatic or cycloaliphatic organic solvent at a temperature ranging from 30° to 150° C. and at a pressure equal to or higher than the atmospheric value, in the presence of metal-alkyl or metal-aryl catalysts.

8. Process according to claim 6, wherein the coupling step is carried out at a temperature ranging from 110° to 125° C. in the presence of a coupling agent selected from the group consisting of esters of aliphatic and aromatic dicarboxylic acids, chlorine derivatives of aliphatic and aromatic hydrocarbons, halogen derivatives of aliphatic and aromatic silanes, arenes containing unsaturated hydrocarbon radicals, tri- and tetra-chlorine derivatives of tin and germanium, and tri- and tetra-chloro silanes.

9. Process according to claim 8, wherein the coupling agent is silicon tetrachloride or $CH_3SiCl_3$.

10. Process according to claim 6, wherein the hydrogenation step is carried out in the presence of a hydrogenation catalyst, at a hydrogen pressure of from 20 to 1,000 psi and at a temperature ranging from 30° to 200° C.

11. Process according to claim 10, wherein the hydrogenation step is carried out at a hydrogen pressure of between 150 and 600 psi, at a temperature from 40° to 130° C. using a catalyst obtained by contact of an aluminum alkyl with a nickel or cobalt compound.

12. Process according to claim 6, wherein the diolefin is butadiene and the vinylaromatic monomer is styrene.

* * * * *